US007725240B2

(12) United States Patent
Peron et al.

(10) Patent No.: US 7,725,240 B2
(45) Date of Patent: May 25, 2010

(54) SYSTEM AND METHOD FOR CONTROL OF AN INTERNAL COMBUSTION ENGINE

(75) Inventors: Ludovic Peron, Lailly en Val (FR); Guillaume Meissonnier, Landes le Gaulois (FR)

(73) Assignee: Delphi Technologies, Inc., Troy, MI (US)

( * ) Notice: Subject to any disclaimer, the term of this patent is extended or adjusted under 35 U.S.C. 154(b) by 191 days.

(21) Appl. No.: 11/975,232

(22) Filed: Oct. 18, 2007

(65) Prior Publication Data

US 2008/0097682 A1 Apr. 24, 2008

(30) Foreign Application Priority Data

Oct. 23, 2006 (EP) ................................ 06291652

(51) Int. Cl.
*F02D 41/00* (2006.01)
*G06F 19/00* (2006.01)

(52) U.S. Cl. ................................................ 701/103

(58) Field of Classification Search ......... 701/103-105, 701/102, 114, 115; 123/305, 478, 480, 486
See application file for complete search history.

(56) References Cited

U.S. PATENT DOCUMENTS

| | | | | |
|---|---|---|---|---|
| 4,509,484 | A | 4/1985 | Gertiser | |
| 6,073,611 | A | 6/2000 | Ohuchi et al. | |
| 6,520,167 | B1 * | 2/2003 | Kanno | 701/103 |
| 7,308,885 | B2 * | 12/2007 | Asano | 701/105 |

FOREIGN PATENT DOCUMENTS

| | | | |
|---|---|---|---|
| EP | 1143134 | | 10/2001 |
| EP | 1223326 | | 7/2002 |
| JP | H11-117787 | | 4/1999 |
| JP | 2006-77688 | A * | 3/2006 |

OTHER PUBLICATIONS

Hudson C et al.: "Knock measurement for fuel evaluation in spark ignition engines" FUE, IPC Science and Technology Press, Guildford, GB, vol. 80, No. 3, Feb. 2001, pp. 395-407, EX004286395 ISSN: 0016-2361.

Japan Office Action dated Oct. 6, 2009.

* cited by examiner

*Primary Examiner*—Hieu T Vo
(74) *Attorney, Agent, or Firm*—Thomas N. Twomey

(57) ABSTRACT

A method is provided for determining whether an injection parameter correction for fuel quality is required in an internal combustion engine, the engine comprising a plurality of cylinders, each one of the cylinders comprising a combustion chamber into which fuel is injected by an associated fuel injector and within which, in use, combustion events repeatedly occur to define a combustion cycle of the cylinder between successive combustion events. The method comprises observing the speed of the combustion cycles of at least two of the cylinders and analysing the at least two speeds to determine if an injection parameter correction for fuel quality is required. The invention also extends to an injector control unit arranged to determine an injection parameter correction for fuel quality.

42 Claims, 6 Drawing Sheets

FIGURE 1

SYSTEM AND METHOD FOR CONTROL OF AN INTERNAL COMBUSTION ENGINE

This invention relates to systems and methods for control of an internal combustion engine. In particular, this invention relates to systems and methods for controlling the injection of fuel in a compression-ignition engine.

In a compression-injection internal combustion engine, such as a diesel engine, combustion takes place within one or more combustion chambers or cylinders, each chamber being defined partly by a reciprocating piston and partly by the walls of a cylinder bore formed in a cylinder head. The piston slides within the cylinder so that, when the engine is running, the volume of the combustion chamber cyclically increases and decreases. When the combustion chamber is at its minimum volume, the piston is said to be at 'top dead centre' (TDC), and when the combustion chamber is at its maximum volume, the piston is said to be at 'bottom dead centre' (BDC).

The piston is connected to a cranked portion of a crankshaft by way of a connecting rod. The reciprocating motion of the piston therefore corresponds to rotary motion of the crankshaft, and it is customary in the art to define the position of the piston according to the angle of the cranked portion of the crankshaft, with TDC corresponding to a crank angle of zero degrees. During a complete internal combustion cycle, comprising intake, compression, power and exhaust strokes of the piston, the crankshaft undergoes two whole revolutions, corresponding to a crank angle movement of 720°.

During the compression stroke of the cycle, the air charge inducted to the combustion chamber during the intake stroke is compressed by the action of the piston. The temperature and pressure of the charge in the combustion chamber thus increases. Fuel is injected into this hot, high pressure air by way of a fuel injector. Upon mixing with the air and becoming heated, the fuel spontaneously ignites and burns within the combustion chamber. This causes rapid expansion of the gases within the combustion chamber, forcing the piston downwards and thus applying a torque to the crankshaft. Air intake into the combustion chamber and exhaust expulsion from the combustion chamber are controlled by means of intake and exhaust valves, respectively.

A fuel injector, and its associated control system, is shown schematically in FIG. 1. An actuator 20 of the fuel injector 22 is operable to control the position of an injector valve needle 24 relative to a valve needle seat 26. The axial position, or 'lift', of the valve needle 24 is controlled by applying a variable voltage 'V' or a variable current to the actuator 20. The valve needle 24 is therefore caused either to disengage the valve seat 26, in which case fuel is delivered into the associated combustion chamber (not shown) through a set of nozzle outlets 28, or is caused to engage the valve seat 26, in which case fuel delivery through the outlets 28 is prevented.

The control system 30 for the fuel injector 22 comprises an engine control unit (ECU) 32. The ECU 32 comprises an injector control unit (ICU) 34 in communication with an injector drive circuit 36. The ECU 32 is arranged to receive input parameters 38 comprising, for example, signals from a plurality of sensors which are arranged to measure certain engine operating parameters. Such parameters may include the crank angle, coolant, oil and intake air temperatures, engine load parameters and so on. The ECU 32 generates an engine load signal (not shown) which is fed to the ICU 34. The ICU 34 generates an injector event sequence or injection timing demand 40 required to provide the necessary engine power, as indicated by the engine load signal. The ICU 34 operates the injector drive circuit 36 according to the injector timing demand 40. The injector drive circuit 36 varies the voltage or current applied to the injector from a high value to a low value, or vice versa, to operate the injector and release fuel into the combustion chamber according to the injector timing demand.

The length of time between the start of fuel injection and ignition of the fuel is known as the ignition delay. To achieve smooth running of the engine, it is generally preferable for the ignition delay to be as short as possible. If the ignition delay is long, then a large amount of fuel is injected into the combustion chamber before ignition occurs. Once ignition does occur, the fuel burns rapidly, causing a sudden increase in the volume of gases within the combustion chamber, akin to an explosion. This can cause unstable or rough running of the engine. For example, the rapidly combusting gases may give rise to a knocking sound audible outside the engine, known as diesel knock, and unacceptable levels of vibration. Furthermore, when the force generated by the combusting gases is applied too rapidly to the piston, the power output of the engine may be compromised. Incomplete combustion of the fuel may also occur, giving rise to excessive emissions of harmful constituents in the exhaust gas and increased fuel consumption.

Conversely, when the ignition delay is short, ignition of the fuel occurs when only a small amount of fuel has been injected into the combustion chamber. This means that the rate of heat released on combustion of the gases is governed by the rate of injection of fuel and the rate at which fuel and air are mixed within the combustion chamber to achieve a combustible mixture. Therefore, the rate of expansion of the gases and, consequently, the rate at which force is applied to the piston are more readily controlled, and can be optimised to provide smooth running of the engine and the desired efficiency and power output characteristics.

Ignition delay is strongly influenced by the ignition characteristics of the fuel. A fuel which ignites at lower temperatures and pressures will give rise to a shorter ignition delay than a fuel which ignites at higher temperatures and pressures. These ignition characteristics, known as the 'ignition quality' or simply the 'quality' of the fuel, are quantified by the cetane number of the fuel. A fuel with good ignition characteristics has a high cetane number, as exemplified by cetane itself (n-hexadecane, $C_{16}H_{34}$) which, by definition, has a cetane number of 100. A fuel with poor ignition characteristics has a low cetane number, as exemplified by isocetane (heptamethylnonane, $C_{16}H_{34}$) which, by definition, has a cetane number of 15.

Ignition delay is also influenced by the timing of the fuel injection event. Typically, fuel injection takes place over approximately 20° of crank angle, and begins between 15° and 20° before TDC. If fuel injection begins early, before the temperature and pressure in the combustion chamber have reached relatively high values, the temperature and pressure must rise further before ignition occurs, giving rise to a lengthy ignition delay. Likewise, if fuel injection begins late, conditions for mixing of the fuel with the air in the combustion chamber are not optimised. Therefore, an optimum injection timing exists, at which the ignition delay is minimised. This optimum timing is embodied by the crank angle at which fuel injection starts.

The optimum injection timing varies with the cetane number of the fuel. In addition, the optimum injection timing is also a function of the load on the engine, and the temperature.

The adverse effects of an excessively long ignition delay, due to incorrect injection timing, are particularly disadvantageous in automotive applications. The drivability of the vehicle may be affected, for example by a lack of response to acceleration, and the vibration and noise that results detracts from the refinement of the vehicle. Furthermore, emissions legislation imposes particularly stringent limits on the acceptable quantities of harmful constituents in exhaust gases, and low fuel consumption is an important market factor which also contributes to low emissions.

Petroleum-derived diesel fuels available for use in automotive compression-ignition engines comprise a mixture of hydrocarbon compounds, often combined with a range of additives and impurities, and typically have a cetane number of between 40 and 55. For example, most diesel sold within the UK has a cetane number of 51 while, in the USA, most commercial diesel fuels have a cetane number of around 45. To ensure that the injection timing of an automotive compression-ignition engine is optimised, the engine is calibrated during manufacture, and during servicing or maintenance if necessary, so that the injection timing is optimised when used with a fuel having a cetane number falling within a relatively narrow range and corresponding to the cetane number of the fuel most likely to be used by the operator of the vehicle.

This strategy of cetane number calibration relies upon the availability of fuel having a cetane number close to that for which the engine has been calibrated. If fuel with a substantially different cetane number is to be used, the injection timing must be re-calibrated during maintenance of the vehicle to avoid the aforementioned problems associated with long ignition delays.

A problem with such a strategy arises when the fuels available to the user of a vehicle have cetane numbers falling outside the range for which the injection timing has been calibrated. This may occur, for example, in countries where the range of cetane numbers is not closely controlled or monitored, or when a vehicle is driven or transported to a different country having fuels with a different typical cetane number. In an extreme case, the cetane number of the fuel available could vary widely on a daily basis.

There is also a growing desire to expand the range of fuels available for use in automotive applications. For example, biodiesel fuels, made by transesterification of fats or vegetable oils, have a lesser environmental impact than petroleum-derived fuels, and are typically cheaper and easier to process than petroleum-derived products. Biodiesel fuels also tend to require less additives than petroleum-derived fuels. The cetane number of biodiesel is often higher than that for petroleum-derived diesel, but varies widely according to the raw material used and the processing conditions. It can be contemplated, therefore, that biodiesel could be supplied with cetane numbers over a wide range.

It is therefore desirable to provide a strategy to vary the injection timing or other appropriate parameters of an engine in response to changes in the cetane number of the fuel supplied to the engine, to maintain an optimum injection timing and hence an optimum ignition delay irrespective of the cetane number of the fuel.

One strategy for allowing a range of fuels with differing cetane numbers to be used involves determining a range of injection timing calibration settings for target fuels with a range of cetane numbers, and storing these calibration settings for use in a control system of the engine. However, the time and cost of such multiple calibration is proportional to the number of target fuels. Means must also be provided for switching the calibration settings when the cetane number of the fuel changes.

An alternative strategy is to estimate or measure the cetane number of the fuel in real time. A signal is generated from a measurement of some parameter related to the cetane number, and the signal is input to a controller. The controller determines the optimum injection timing from the input signal related to the cetane number and from other input signals relating to, for example, engine temperature, engine speed and so on.

US Patent Application Publication No. US 2004/0261414 A describes a system in which the specific gravity of the fuel is calculated from measurements of the amount of air drawn into the cylinder, the total amount of fuel injected and the amount of residual oxygen in the exhaust gas. The cetane number of the fuel is related to the specific gravity of the fuel. A controller uses the calculated specific gravity to adjust a combustion-related parameter, such as the injection timing, for variations in fuel quality.

U.S. Pat. No. 5,709,196 describes an injection timing control system in which an input signal to an injection timing controller is derived from an exhaust gas sensor. The exhaust gas sensor measures the concentration of selected exhaust gas constituents, such as carbon monoxide. An increased or diminished carbon monoxide level, when compared to an acceptable reference range, indicates poor engine performance caused by incorrect injection timing. If the input signal from the exhaust gas sensor indicates a carbon monoxide concentration outside of the acceptable range, the injection timing is modified by the controller in order to restore the carbon monoxide level to a value within the acceptable range.

Both of the aforementioned systems require monitoring of exhaust gas constituents using suitable sensors. Sometimes, this may however be impractical. For example, in some vehicles, an emission reduction strategy comprising an exhaust gas recirculation system is employed. The exhaust gas recirculation system allows a variable portion of the exhaust gases to be fed back to an intake manifold of the engine when required, so as to reduce the combustion temperature of the gases within the combustion chamber. When such a system is operating, the composition of the exhaust gases is no longer a reliable indicator of the fuel quality and thus cannot be readily used as a parameter in control of the combustion elements.

Furthermore, in some engine operating conditions, the composition of the exhaust gases is not significantly affected by changes in the cetane number of the fuel. For example, the present applicant has found this to be the case when an engine is running in a retarded combustion condition, and especially in cold and low load conditions. When running in a retarded combustion condition, combustion of the gases in the combustion chamber occurs mainly after TDC. This can be effective in reducing emissions during cold-starting, for example.

Consequently, it would be desirable to provide a system capable of monitoring the cetane number of the fuel in an alternative way, so as to enable adjustment of the injection timing and other controllable parameters of the combustion process.

According to a first aspect of the invention, there is provided a method for determining whether an injection parameter correction for fuel quality is required in an internal combustion engine, the engine comprising a plurality of cylinders, each one of the cylinders comprising a combustion chamber into which fuel is injected by an associated fuel injector and within which, in use, combustion events repeatedly occur to define a combustion cycle of the cylinder between successive combustion events. The method comprises observing the speed of the combustion cycles of at least two of the cylinders, and analysing the at least two speeds to determine if an injection parameter correction for fuel quality is required.

The step of analysing the at least two speeds may comprise computing and storing combustion cycle speeds for the at least two cylinders, in which case the step of analysing the at least two speeds may further comprise computing a sequence of speed fluctuation levels for each of the at least two cylinders from the stored combustion cycle speeds. Preferably, the method comprises computing each one of the speed fluctuation levels of the sequence by comparing a deviation parameter, such as a standard deviation, of a plurality of the stored combustion cycle speeds for a cylinder with a mean of the plurality of the stored combustion cycle speeds for that cylinder, and computing each successive speed fluctuation level of the sequence from successive pluralities of the combustion cycle speeds.

The step of analysing the at least two speeds may further comprise identifying abnormal speed fluctuations in the cylinders, for example by comparing each of the speed fluctuation levels to a threshold value. The method may comprise identifying an abnormal speed fluctuation when at least two consecutive ones of the speed fluctuations of the sequence are greater than the threshold value. The step of analysing the at least two speeds may further comprise analysing the occurrence of abnormal speed fluctuations in two or more of the cylinders so as to determine if an injection parameter correction for fuel quality is required. For example, it may be determined that an injection parameter correction for fuel quality is required when abnormal speed fluctuations occur in two or more of the cylinders at substantially the same time.

The first aspect of the present invention extends to a method of determining an injection parameter correction for fuel quality, comprising determining if an injection parameter correction is required in accordance with the method previously described and, if so, adjusting an injection parameter to determine the injection parameter correction for fuel quality.

The injection parameter may comprise the quantity of fuel delivered with each injection, and the injection parameter correction may comprise a modification of the quantity of fuel delivered with each injection. Alternatively, the injection parameter may comprise the interval between consecutive injections of fuel and the injection parameter correction may comprise a modification of the interval between consecutive injections of fuel.

Preferably, the injection parameter comprises an injection timing and the injection parameter correction is an injection timing correction. The injection timing correction may, for example, comprise a modification of the timing at which fuel is injected relative to the combustion cycles of the cylinders.

A plurality of injection parameter corrections may be determined for a plurality of associated injection parameters. For example, corrections may be determined for the injection timing and the injection quantity simultaneously or sequentially on implementation of the method. By providing more than one injection parameter for which an injection parameter correction is determined, the running of the engine due to changes in fuel quality can be further optimised.

In one embodiment of the method, the injection parameter correction may be determined by providing a calibration curve comprising a plurality of injection parameter correction values, each correction value being associated with a magnitude of a speed fluctuation, then addressing the calibration curve with the computed speed fluctuation of a cylinder and reading the correction value associated with the computed speed fluctuation in the calibration curve so as to determine the injection parameter correction. The calibration curve may be embodied as a look-up table.

Conveniently, the injection parameter correction is an incremental correction, in which case the method may comprise reading a magnitude of the incremental correction from a memory. In any case, the injection parameter correction may be an offset to be applied to the injection parameter.

The method may further comprise repeating the steps of observing the speed of the combustion cycles of at least two of the cylinders, analysing the at least two speeds to determine if an injection parameter correction for fuel quality is required and, if so, adjusting the injection parameter so as to arrive at an optimised injection parameter correction for fuel quality. In this way, the running conditions of the engine can be incrementally adjusted until an optimum running condition is obtained.

The method may further comprise determining a weighting function for engine load and applying the weighting function to the injection parameter correction. In this case, an injection parameter correction can be determined under a fixed set of engine conditions, for example when the engine is idling, and that injection parameter correction can then be weighted so as to provide a suitable injection parameter for smooth running under different engine conditions, for example at engine speeds and loads above idle. To this end, or for other reasons, the injection parameter correction may be stored in a memory.

The first aspect of the invention also extends to a method for determining an injection parameter corrected for fuel quality in an internal combustion engine, comprising determining an injection parameter correction in accordance with the method described above, and adjusting the injection parameter in accordance with the injection parameter correction for a subsequent combustion event.

The method for determining the injection parameter may comprise determining a nominal injection parameter according to an engine load demand, and applying an injection parameter correction to the nominal injection parameter so as to determine an injection parameter corrected for fuel quality.

If the engine employs pilot and/or post injections, the method of the invention may comprise applying the injection parameter correction to pilot and/or post injections of the fuel injector.

The invention is applicable to an engine having two or more engine cylinders. Preferably, the method comprises observing the speed of the combustion cycles of all of the cylinders of the engine. For example, in a four-cylinder engine, the speed of the combustion cycles of all four cylinders may be observed and the four speeds may be analysed to determine if an injection timing correction for fuel quality is required.

According to a second aspect of the present invention, there is provided an injector control unit for an internal combustion engine, the engine comprising a plurality of cylinders, each one of the cylinders comprising a combustion chamber into which fuel is injected by an associated fuel injector and within which, in use, combustion events repeatedly occur to define a combustion cycle of the cylinder between successive combustion events. The injector control unit is arranged to control an injection parameter and comprises means for observing the speed of the combustion cycles of at least two of the cylinders and means for analysing the at least two speeds to determine if an injection parameter correction for fuel quality is required.

Preferably, the injector control unit also comprises means for adjusting the injection parameter to provide the injection parameter correction for fuel quality if it is determined that the injection parameter correction is required.

As in the method of the invention, the injection parameter may comprise an injection timing, and the injection parameter correction may comprise an injection timing correction. The injection timing correction may comprise a modification of the timing at which fuel is injected relative to the combustion cycles of the cylinders. The injector control unit may be arranged to determine injection parameter corrections for other injection parameters, such as fuel quantity, or a plurality of injection parameter corrections for a plurality of associated injection parameters.

The injector control unit may further comprise an input for receiving a speed signal relating to the speed of the combustion cycles, an observer arranged to determine a sequence of speed fluctuation levels for each of the two or more cylinders from the speed signal, and an output for outputting the sequence of speed fluctuation levels for each of the two or more cylinders. An observer memory in communication with the observer may also be provided.

Conveniently, the speed signal may be a crank angle signal. A crank angle sensor is fitted to almost all internal combustion engines. The signal from the sensor is used by the ECU of the engine to determine the timing of inlet and exhaust valve opening and closing, and the speed of the engine, as well as the injection timing. Therefore, when the speed signal is a crank angle signal, the present invention requires no sensors or equipment additional to those already routinely fitted to an engine. As a result, the invention could be embodied within the software of the ECU, making the solution of the invention cost effective.

The injector control unit may further comprise an input for receiving the sequence of speed fluctuation levels for each of the two or more cylinders, and a correction controller for determining the injection parameter correction. A correction controller memory in communication with the correction controller may also be provided. Furthermore, the correction controller may include means for identifying abnormalities in the sequence of speed fluctuation levels, and means for determining if the abnormalities are a result of fuel quality.

The injector control unit may comprise means for determining a nominal injection parameter, such as a nominal injection timing demand, and means for applying the injection parameter correction to the nominal injection parameter so as to determine a corrected injection parameter.

The invention extends to an engine control unit comprising such an injection control unit, and means for actuating a fuel injector according to the corrected injection parameter. The means for actuating the fuel injector may comprise an injector drive circuit. The engine control unit may comprise an input arranged to receive parameters associated with running conditions of the engine.

The invention also extends to a system for controlling a fuel injector of an internal combustion engine, the system comprising an injector control unit as previously described, or an engine control unit as previously described.

Because no knowledge of the exhaust gas constituents is required by the present invention, operation of the invention is not affected by the use of, for example, exhaust gas recirculation systems. The invention is also effective at providing an appropriate injection parameter correction even when the exhaust gas composition is not affected significantly by changes in the fuel quality, for example in engines running in a retarded combustion condition.

Reference has already been made to FIG. 1, which is a schematic representation of a known fuel injector and its associated control system. The present invention will now be described, by way of example only, with reference to the accompanying drawings in which.

Figure 1:
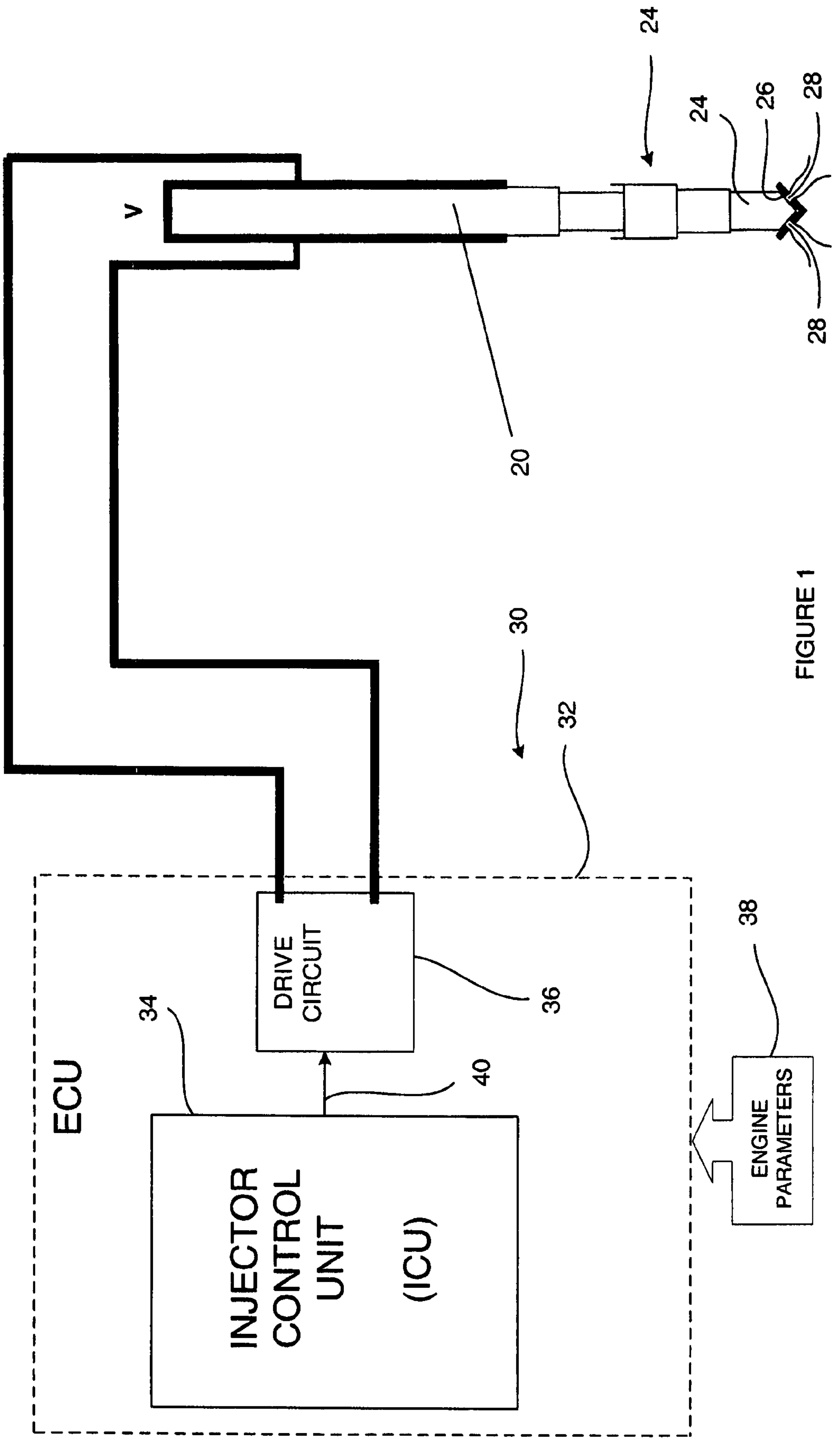
Figure 2:
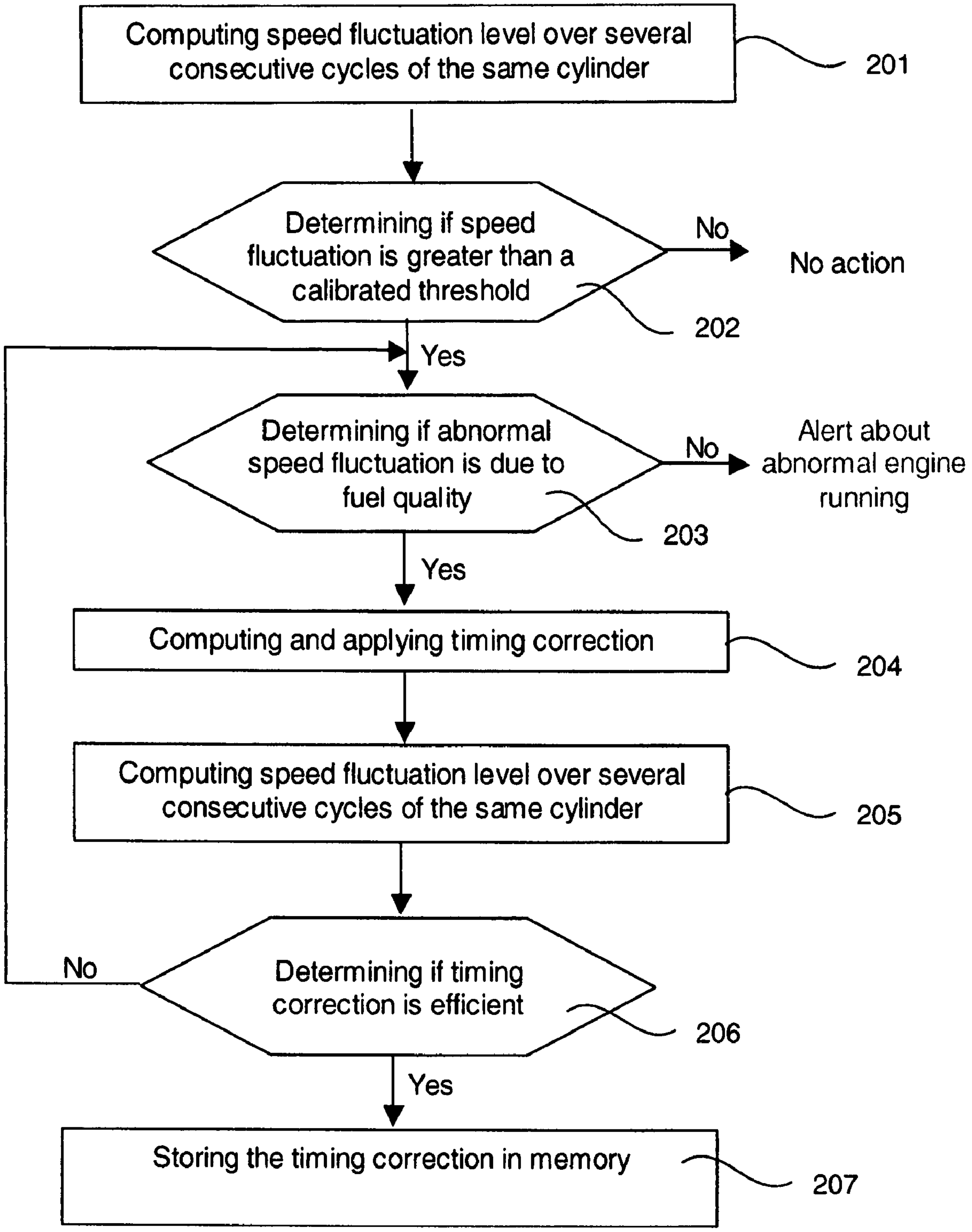
FIG. 2 is a flow chart of a method of determining an injector timing correction according to a first aspect of the invention.

Referring first to the flow chart of FIG. 2, there is provided a method of determining whether an injection parameter correction to compensate for changes in the quality of fuel provided to the engine is required, and for determining the injection parameter correction if required. The method may be implemented in an engine control unit (ECU). A first embodiment of the method will now be described, in which the injection parameter correction is an injection timing correction.

Figure 3:
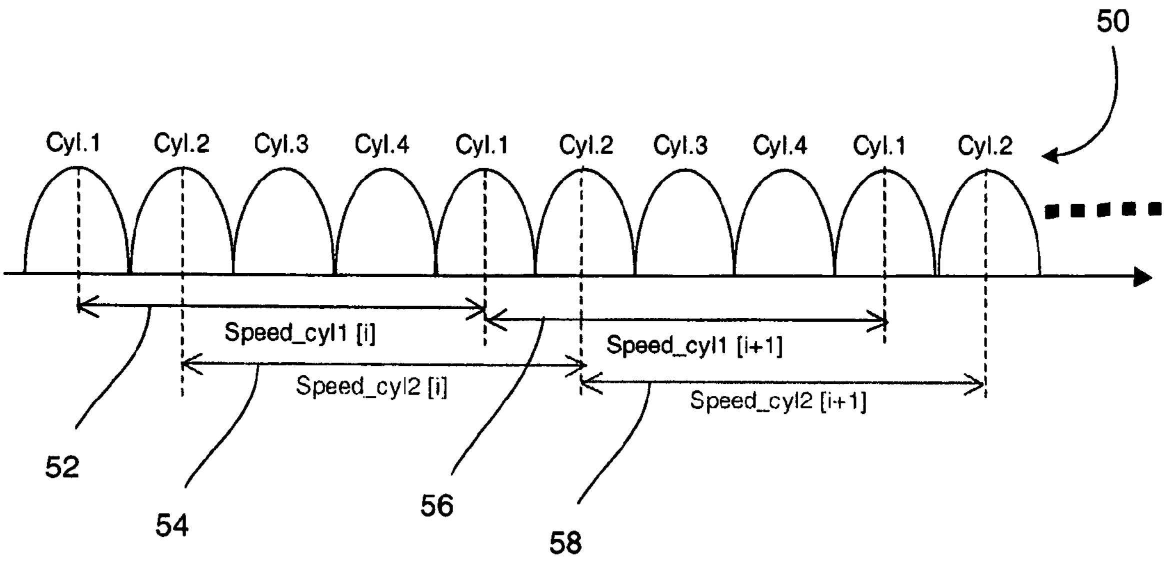
FIG. 3 is a schematic representation of a signal related to the speed of combustion cycles of the cylinders of an engine, for use in the method of FIG. 2.

In a first step 201 of the method, the speed of the combustion cycle, defined by the time taken between consecutive combustion events, is determined for each cylinder of the engine. FIG. 3 is a schematic representation of a signal 50 suitable for use in determining the speed of the combustion cycle of a cylinder. Each cylinder is denoted by a number, X, and FIG. 3 shows speeds for X=1 and X=2. The vertical axis of FIG. 3 represents the position of the piston of each cylinder undergoing a compression and combustion stroke, relative to a reference point midway between TDC and BDC. Only the piston positions relevant to the speed determination are shown. A speed is recorded over a pre-determined number, N, of consecutive cycles of each cylinder, X, by computing the time interval between the piston of the cylinder reaching TDC at the end of a compression stroke on successive combustion cycles. As shown in FIG. 3, the speed of the ith combustion cycle thus calculated for cylinder X is labelled speed_cylX [i] 52, 54, 56, 58. Once a speed has been calculated, it is stored in a buffer for that cylinder, such that:

$$\text{speed\_cyl}X\text{\_buffer}=[\text{speed\_cyl}X[i],\text{speed\_cyl}X[i+1],\ldots,\text{speed\_cyl}X[N]]$$

When N speed values have been stored in each buffer, a speed fluctuation level is then computed for each cylinder. The speed fluctuation level is representative of the deviation of the recorded speeds from the mean speed over N cycles. Therefore, for cylinder X, the speed fluctuation level is:

$$\text{fluctuation\_cyl}X\text{\_level}=\text{std}(\text{speed\_cyl}X\text{\_buffer})/\text{mean}(\text{speed\_cyl}X\text{\_buffer})$$

where 'std' denotes the standard deviation of the terms in the buffer, and 'mean' denotes the arithmetic mean of the terms in the buffer.

A speed fluctuation level is thus determined for each cylinder of the engine. Thus, for a four-cylinder engine, four associated speed fluctuation levels, with X=1 to 4, will be determined.

Figure 4:
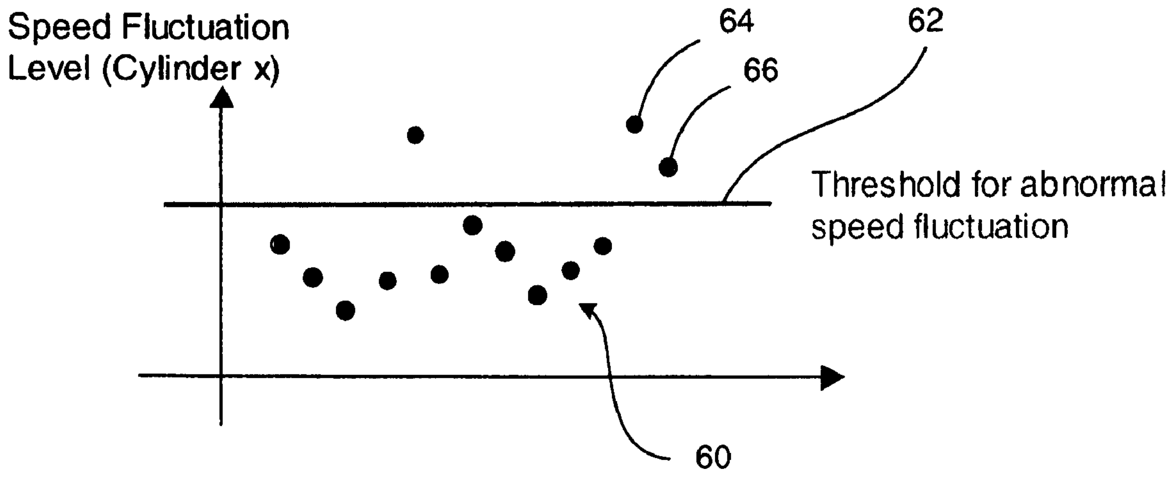
FIG. 4 is a schematic representation of the speed of successive combustion cycles within a cylinder, determined from the signal of FIG. 3.

In a second step 202 of the method, the speed fluctuation levels 60 for each cylinder are compared to a pre-defined threshold 62, as shown schematically in FIG. 4. This threshold 62 represents an acceptable level of speed fluctuation, it being inevitable that, at constant engine speed, there will be some variation in the speed of consecutive combustion cycles of a cylinder due to variations in cylinder temperature, air intake volume, combustion temperatures and so on.

An abnormal speed fluctuation is defined as occurring when at least two successive speed fluctuation levels (labelled 64 and 66 in FIG. 4) of a given cylinder exceed the predetermined threshold 62. If there is no abnormal speed fluctuation, no further action is taken, and determination of the combustion cycle speed 52, 54, 56, 58 of each cylinder continues in accordance with the first step 201 of the method.

If, however, an abnormal speed fluctuation 64, 66 is detected for any cylinder, the speed fluctuation levels 60 are further analysed in a third step 203 of the method to test whether the abnormal speed fluctuation 64, 66 is due to a change in the fuel quality, for example a discrepancy between the cetane number of the fuel being supplied to the engine and the cetane number of the fuel for which the engine is currently set to use.

The abnormal speed fluctuations 64, 66 are attributed to a change in the fuel quality when abnormal speed fluctuations 64, 66 occur in every one of the cylinders at or around the same time. This arises because the fuel supply is common to all of the cylinders, so a change in the fuel quality affects all of the cylinders simultaneously.

If abnormal speed fluctuations 64, 66 do not occur in every cylinder, the abnormal speed fluctuations 64, 66 are attributed to a cause other than a change in the fuel quality, and a fault is recorded. For example, a fault code may be written to a memory of the ECU. Determination of the combustion cycle speed 52, 54, 56, 58 of each cylinder then continues in accordance with the first step 201 of the method.

If the abnormal speed fluctuations 64, 66 have been attributed to a change in the fuel quality, then in a fourth step 204 of the method, an injection timing correction is computed to compensate for the change in fuel quality. The injection timing correction comprises an offset to be added or subtracted to a nominal injection timing determined on the basis of the nominal engine demand, so as to advance or retard the beginning of the fuel injection event and stabilise the running of the engine by removing the abnormal speed fluctuations. The computed injection timing correction may be stored in a memory of the ECU during this step.

In this first embodiment of the invention, the fourth step 204 of the method comprises determining the injection timing correction from a calibration curve (not shown) stored within a memory of the ECU. The calibration curve correlates the magnitude of a speed fluctuation level with the cetane number of the fuel relative to a reference cetane number for which substantially no speed fluctuation level is observed. In other words, the calibration curve is a record of the timing offset required to stabilise the running of the engine for a range of speed fluctuation levels. The injection timing correction required is that which corresponds to the observed speed fluctuation level in the calibration curve.

The calibration curve is determined from pre-service calibration tests using a range of fuels with different cetane numbers. These calibration tests may be performed on each individual engine during manufacture of the engine, or may be performed on a reference engine to determine a calibration curve for storage in the ECU memory of production engines during manufacture. The calibration curve may be embodied as a look-up table.

In a fifth step 205 of the method, the first step 201 of the method is repeated after application of the correction to the injection timing according to the fourth step 204. In a sixth step 206 of the method, the newly-determined speed fluctuation levels 60 are compared to the threshold value 62, as in the second step 202 of the method, so as to determine whether abnormal speed fluctuation levels 64, 66 are still present.

If abnormal speed fluctuation levels 64, 66 are still present, the third step 203, fourth step 204 and fifth step 205 of the method are repeated, using the previously determined injection timing correction as the starting point for the process, so as to eliminate abnormal speed fluctuation levels 64, 66 attributable to changes in fuel quality. In this state, the injection timing is optimised for the fuel currently supplied to the engine when the determined injection timing correction is applied.

Once no further abnormal speed fluctuation levels 64, 66 attributable to changes in fuel quality are detected, the injection timing correction that gives rise to this optimum condition is stored in the memory of the ECU in a seventh step 207 of the method.

An injection timing correction is determined and stored according to the method of FIG. 2 when the engine is running in a particular, well defined condition. For example, the injection timing correction may be determined when the engine is running at idle; that is, at low, constant speed and low, constant engine load. The stored injection correction timing is then applied to the injection timing of the engine, as will now be described.

Figure 5:
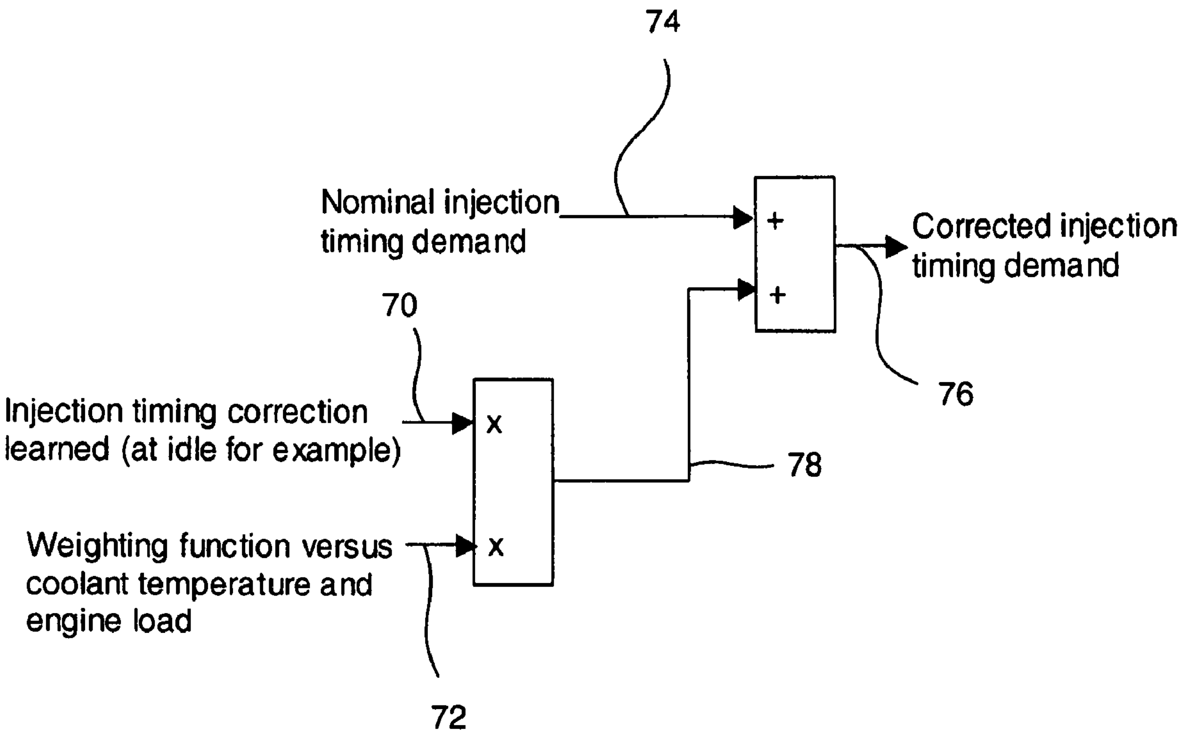
FIG. 5 is a flow diagram showing the determination of a corrected injection timing demand according to the method of FIG. 2.

Referring to FIG. 5, the stored injection timing correction 70 is modified by a multiplying factor or weighting function 72 so as to compensate for the coolant temperature and the engine load and achieve smooth running of the engine at all engine loads. As the coolant temperature or the engine load increase, the weighting function 72 decreases so as to reduce the relative amount of correction applied to the injection timing. Application of the weighting function 72 to the stored injection timing correction 70 produces a weighted injection timing correction 78.

A nominal injection timing demand 74 is calculated using, amongst other factors, an engine load signal generated by the ECU. A corrected injection timing demand 76 is then calculated by summing the nominal injection timing demand 74 and the weighted injection timing correction 78. The corrected injection timing demand 76 is output to an injector drive circuit. In accordance with known fuel injector control methods, the injector drive circuit responds to the corrected injection timing demand by appropriate switching of injector drive voltages or currents.

The method of FIG. 5 may also be employed to apply the timing correction calculated in the fourth step 204 of the method of FIG. 2 to the nominal injection timing demand. In this case, the weighting function 72 may be set to unity, so that the weighted timing correction 78 is equal to the timing correction determined in the fourth step 204.

In a second embodiment of the invention, a method is provided which corresponds to the first embodiment of the invention except in that the fourth step 204 of the method comprises providing an injection timing correction of a fixed, incremental value, which may be positive (to retard the injection timing) or negative (to advance the injection timing). The fifth step 205 of the method is then applied as described above. In this case, it is likely that the initially determined injection timing correction will not serve to eliminate abnormal speed fluctuations 64, 66. In that case, the test in the fifth step 205 of the method will return a negative result, and the third step 203, fourth step 204 and fifth step 205 of the method will once again be applied using the previously determined injection timing correction as a starting point. In this way, an optimum injector timing correction is obtained by iteratively applying the third step 203, fourth step 204 and fifth step 205 of the method. The sign of the incremental correction value applied may be reversed if, in the fifth step 205 of the method, it is determined that the speed fluctuation level has increased rather than decreased as a result of the application of the correction in the fourth step 204 of the method.

Figure 6:
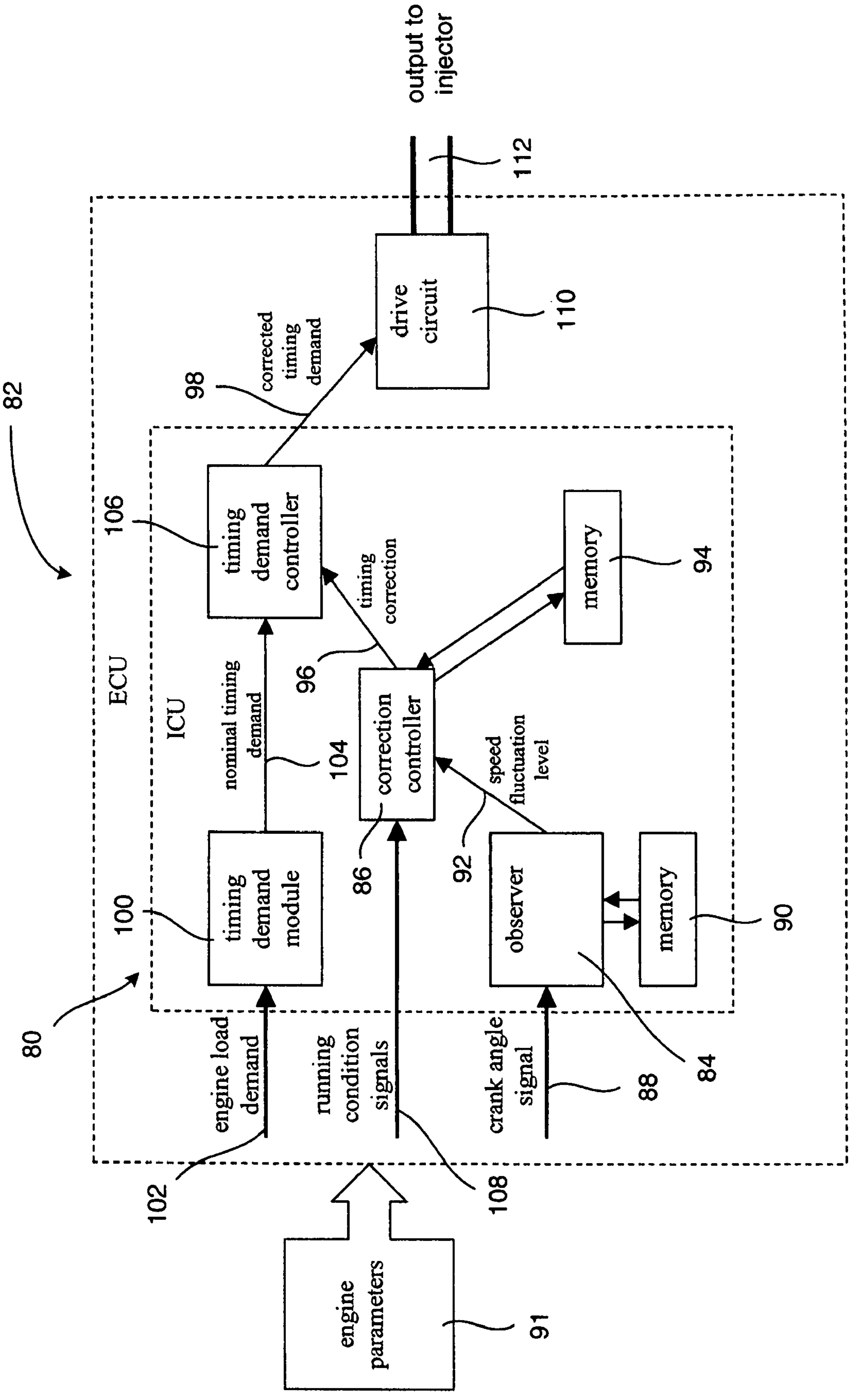
FIG. 6 is a schematic diagram of an injector control unit according to a second aspect of the present invention.

According to a second aspect of the present invention, there is provided an injector control unit (ICU) adapted to implement the method of the first aspect of the invention. Referring to FIG. 6, the ICU 80 is provided within an engine control unit (ECU) 82. The ICU 80 comprises an observer 84 and a correction controller 86. The observer 84 comprises an input for receiving an observer input signal 88 related to the speed of combustion cycles occurring within the cylinders of the engine. The observer input signal 88 comprises a signal generated by a crank angle sensor (not shown) of a known type. The crank angle sensor is in communication with the ECU 82, so that the crank angle signal is included within engine parameters 91 input to the ECU 82. The observer input signal 88 is provided to the observer 84 of the ICU 80 by way of the ECU 82. The crank angle sensor comprises a detector located at a fixed position with respect to a crankshaft sprocket of the engine. The detector detects the presence of indicator teeth provided on the crankshaft sprocket as they pass the detector. The detector may be, for example, a Hall-effect sensor in which case the indicator teeth are magnetised, or an optical sensor in which case the indicator teeth are given an optical coating such as a reflective coating.

When an indicator tooth passes the detector during rotation of the crankshaft, the crank angle sensor outputs a pulse. One indicator tooth is provided for each cylinder of the engine, and the position of the indicator teeth are such that, when the piston of a cylinder is at TDC, the corresponding indicator tooth is detected by the detector and gives rise to a pulse in the output signal of the crank angle sensor. Since two revolutions of the crankshaft occur during a complete combustion cycle, two cylinders may share a common indicator tooth. Using a four-cylinder in-line engine as an example, indicator teeth are positioned at an angular spacing of 180° on the crankshaft sprocket. In other words, the indicator teeth are diametrically opposite one another.

The observer input signal 88 therefore comprises a series of pulses, the timing between pulses corresponding to the time between successive cylinders reaching TDC, and has the form shown schematically in FIG. 3.

The observer 84 is in communication with an observer memory 90. The observer is arranged to determine speed fluctuation levels 92 for each cylinder of the engine as previously described with reference to the first step 201 of the method of FIG. 2. The observer memory 90 comprises a plurality of buffers, each buffer corresponding to a particular cylinder of the engine. The number of buffers is equal to the number of cylinders. The buffers are arrange to store a series of calculated combustion cycle speeds of the associated cylinder. The observer 84 addresses the buffers to write combustion cycle speeds to the buffers, and subsequently to read the buffers to determine the speed fluctuation levels 92 as previously described. An output of the observer 84 carries the calculated speed fluctuation levels 92 and is in communication with an input of the correction controller 86, so that the correction controller 86 thus receives the speed fluctuation levels 92.

The correction controller 86 is in communication with a correction controller memory 94. The correction controller 86 is arranged to first identify abnormalities in the speed fluctuation levels 92 input to the correction controller, in accordance with the second step 202 of the method of the first aspect of the invention. To this end, a threshold value for the speed fluctuation level is stored in the correction controller memory 94. The correction controller 86 includes a comparator (not shown) to determine if an input speed fluctuation level 92 is above the threshold. The correction controller 86 is also arranged so that, when an abnormal speed fluctuation condition is determined for a given cylinder, the correction controller 86 applies a logical AND operation to determine if the abnormal speed fluctuation condition is present in all of the cylinders.

If the logical AND operation returns a positive result, the correction controller 86 outputs an injection timing correction according to the fourth step 204 of the method of the first aspect of the invention.

In a first embodiment of the ICU 80, a calibration curve is stored in the correction controller memory 94, and the correction controller 86 is arranged to read the calibration curve from the memory 94 so as to determine an injection timing correction according to the first embodiment of the method previously described with reference to step 204 of FIG. 2.

In a second embodiment of the ICU 80, an incremental timing correction value is stored in the correction controller memory 94. The correction controller 86 is arranged to read the incremental timing correction value from the memory 94 so as to determine an injection timing correction according to the second embodiment of the method previously described with reference to step 204 of FIG. 2.

In both embodiments of the ICU 80, the thus determined injection timing correction may be stored in the correction controller memory 94. The ICU 80 is arranged to determine a corrected injection timing demand 98 based on the injection timing correction, as will now be described.

The ICU 80 further comprises a timing demand module 100, which is arranged to receive an engine load demand 102 from the ECU 82. The ECU 82 is arranged to calculate the engine load demand 102 according to the engine parameters 91 input to the ECU 82. The timing demand module 100 is arranged to calculate a nominal injection timing demand 104 from the engine load demand 102. This nominal injection timing demand 104 is uncorrected for fuel quality. The nominal injection timing demand 104 is input to a timing demand controller 106 of the ICU 80.

The correction controller 86 receives an input from the ECU 82 comprising signals 108 relating to the running condition of the engine. In particular, the running condition signals 108 comprise engine load and coolant temperature signals. The correction controller 86 is arranged to read the stored injection timing correction (70 in FIG. 5) from the correction controller memory 94 and produce an output comprising a weighted timing correction 96 (76 in FIG. 5) weighted according to the running conditions of the engine, so as to perform the method previously described with reference to FIG. 5.

The timing demand controller 106 is arranged to receive the weighted timing correction 96 from the correction controller 86 and to combine the weighted timing correction 96 with the nominal injection timing demand 104, so as to produce an output signal comprising a corrected timing demand 98.

The corrected timing demand 98 thus determined by the timing demand controller 106 is output from the ICU 80 and forms an input of an injector drive circuit 110 of the ECU 82. In accordance with known injector control systems, the injector drive circuit 110 switches injector drive voltages or currents 112 in response to the corrected timing demand 98 output from the ICU 80.

It will be appreciated that many modifications of the method and ICU of the present invention are possible. Some such modifications will now be described.

The speed of the combustion cycles may be calculated from a signal such as that described with reference to FIG. 3 in any convenient way. For example, a combustion cycle speed may be computed from a time interval between the piston of a cylinder reaching a pre-defined crank angle between TDC and BDC on successive combustion cycles, rather than the time interval between the piston reaching TDC on successive combustion cycles. Such a pre-defined angle may be selected to allow optimum detection of combustion cycle speed fluctuations in the calculated speeds.

Furthermore, the observer input signal (88 in FIG. 6) may take a different form from that previously described. For example, the observer input signal may arise from a camshaft angle sensor or other engine speed sensor. Cylinder pressure sensors could also be used to provide an observer input signal. If a crankshaft angle sensor is used, only one tooth on the crankshaft sprocket may be an indicator tooth, in which case the combustion cycle speed can be calculated for only two of the cylinders of a four cylinder engine. Abnormal fluctuations in both cylinders would be an indicator that an injection timing correction for fuel quality would be required. In the most general case, abnormal fluctuations in at least two cylinders of an engine provides an indication that a timing correction for fuel quality is needed.

Although the second aspect of the present invention has been described as an integrated part of the ICU, it will be appreciated that the second aspect of the present invention could be embodied as a separate module of the ECU, or as a separate unit not integrated with the ECU but in communication with the ECU. For the purposes of this specification, therefore, the term 'injector control unit' should be construed as meaning any components of an engine control system which contribute to the control of fuel injectors.

It will be appreciated that, in modern internal combustion engines, it may be desirable to vary injection parameters other than, or in addition to, the injection timing (e.g. the injection timing demand) to achieve optimum operation of the engine. The desired injection parameters can be altered analogously to the injection timing as described above so as to determine an optimum injection parameter correction to achieve an appropriate engine running condition when the fuel quality is changed.

For example, 'pilot' or 'pre' injections may be provided before a main injection of fuel into the combustion chamber, in which case the number, duration and timing of the 'pilot' injections could be adjusted. Further injections, known as 'post' injections, may occur after a major portion of the fuel quantity has been injected in a main injection, and the number, duration and timing of the 'post' injections could also be varied.

The pressure of the fuel supplied to the fuel injector, or the length of time over which the injector remains open for injection of fuel could also be controlled, so as to modify the quantity of fuel delivered with each injection event. The interval between consecutive fuel injections could also be controlled.

The injection parameter need not be directly associated with the fuel injectors. For example, the injection parameter could be the temperature within the combustion chamber, by way of a heating and/or cooling system associated with the combustion chamber. The intake of air to the combustion chamber could also be varied, for example by operating valves or other mechanical elements to control the intake air pressure or the intake air swirl.

The invention claimed is:

1. An injector control unit for an internal combustion engine, the engine comprising a plurality of cylinders, each one of the cylinders comprising a combustion chamber into which fuel is injected by an associated fuel injector and within which, in use, combustion events repeatedly occur to define a combustion cycle of the cylinder between successive combustion events; wherein the injector control unit is arranged to determine an injection timing correction and comprises:

an observer for calculating a series of combustion cycle speeds; and a correction controller for determining an injection timing correction;

wherein the observer includes:

an input for receiving at least one signal relating to the speed of the combustion cycles of the cylinders; and an observer memory comprising a plurality of buffers for storing the series of combustion cycle speeds;

wherein the observer is arranged to determine a series of speed fluctuation levels from the combustion cycle speeds; and wherein the correction controller includes:

an input for receiving the speed fluctuation levels from the observer;

a memory for storing a threshold speed fluctuation level;

a comparator for determining if the speed fluctuation levels are abnormal with respect to the threshold speed fluctuation level;

a logic element to determine, by a logic operation, if abnormal speed fluctuation levels are occurring in all of the cylinders of the engine; and an output for outputting an injection timing correction.

2. An injector control unit for an internal combustion engine, the engine comprising a plurality of cylinders, each one of the cylinders comprising a combustion chamber into which fuel is injected by an associated fuel injector and within which, in use, combustion events repeatedly occur to define a combustion cycle of the cylinder between successive combustion events; wherein the injector control unit is arranged to control an injection parameter and comprises:

an arrangement for observing the speed of the combustion cycles of at least two of the cylinders; and an arrangement for analysing the at least two speeds to determine if an injection parameter correction for fuel quality is required.

3. The injector control unit of claim 2, further comprising an arrangement for adjusting an injection parameter to provide the injection parameter correction for fuel quality if it is determined that the injection parameter correction is required.

4. The injector control unit of claim 3, wherein the injection parameter comprises an injection timing and the injection parameter correction comprises an injection timing correction.

5. The injector control unit of claim 4, wherein the injection timing correction comprises a modification of the timing at which fuel is injected relative to the combustion cycles of the cylinders.

6. The injector control unit of claim 2, further comprising:

an input for receiving a speed signal relating to the speed of the combustion cycles;

an observer arranged to determine a sequence of speed fluctuation levels for each of the two or more cylinders from the speed signal; and an output for outputting the sequence of speed fluctuation levels for each of the two or more cylinders.

7. The injector control unit of claim 6, further comprising an observer memory in communication with the observer.

8. The injector control unit of claim 6, wherein the speed signal is a crank angle signal.

9. The injector control unit of claim 6, further comprising:

an input for receiving the sequence of speed fluctuation levels for each of the two or more cylinders; and a correction controller for determining the injection parameter correction.

10. The injector control unit of claim 9, further comprising a correction controller memory in communication with the correction controller.

11. The injector control unit of claim 9, wherein the correction controller includes:

an arrangement for identifying abnormalities in the sequence of speed fluctuation levels; and an arrangement for determining if the abnormalities are a result of fuel quality.

12. The injector control unit of claim 2, further comprising:

an arrangement for determining a nominal injection parameter; and an arrangement for applying the injection parameter correction to the nominal injection parameter so as to determine a corrected injection parameter.

13. An engine control unit comprising:

an injection control unit as defined in claim 12; and an arrangement for actuating a fuel injector according to the corrected injection parameter.

14. The engine control unit of claim 13, wherein the arrangement for actuating the fuel injector comprises an injector drive circuit.

15. The engine control unit of claim 13, comprising an input arranged to receive parameters associated with running conditions of the engine.

16. A system for controlling a fuel injector of an internal combustion engine, the system comprising an engine control unit according to claim 13.

17. A system for controlling a fuel injector of an internal combustion engine, the system comprising an injector control unit according to claim 2.

18. A method for determining an injection timing corrected for fuel quality in an internal combustion engine, the engine comprising a plurality of cylinders, each one of the cylinders comprising a combustion chamber into which fuel is injected by an associated fuel injector and within which, in use, combustion events repeatedly occur to define a combustion cycle of the cylinder between successive combustion events; the method comprising:

determining a speed of the combustion cycle of each cylinder;

computing a speed fluctuation level for each cylinder;

comparing the speed fluctuation levels to a threshold value to identify abnormal speed fluctuation levels;

determining if the abnormal speed fluctuation levels, if present, are due to fuel quality; and, if so, computing an injection timing correction to compensate for abnormal speed fluctuations due to fuel quality; and applying the injection timing correction to a nominal injection timing to provide an injection timing corrected for fuel quality.

19. A method for determining whether an injection parameter correction for fuel quality is required in an internal combustion engine, the engine comprising a plurality of cylinders, each one of the cylinders comprising a combustion chamber into which fuel is injected by an associated fuel injector and within which, in use, combustion events repeatedly occur to define a combustion cycle of the cylinder between successive combustion events; the method comprising:

observing the speed of the combustion cycles of at least two of the cylinders; and analysing the at least two speeds to determine if an injection parameter correction for fuel quality is required.

20. The method of claim 19, wherein the step of analysing the at least two speeds comprises computing and storing combustion cycle speeds for the at least two cylinders.

21. The method of claim 20, wherein the step of analysing the at least two speeds further comprises computing a sequence of speed fluctuation levels for each of the at least two cylinders from the stored combustion cycle speeds.

22. The method of claim 21, comprising computing each one of the speed fluctuation levels of the sequence by comparing a deviation parameter of a plurality of the stored combustion cycle speeds for a cylinder with a mean of the plurality of the stored combustion cycle speeds for that cylinder, and computing each successive speed fluctuation level of the sequence from successive pluralities of the combustion cycle speeds.

23. The method of claim 21, wherein the step of analysing the at least two speeds further comprises identifying abnormal speed fluctuations in the cylinders.

24. The method of claim 23, comprising identifying the abnormal speed fluctuations by comparing each of the speed fluctuation levels to a threshold value.

25. The method of claim 24, comprising identifying an abnormal speed fluctuation when at least two consecutive ones of the speed fluctuations of the sequence are greater than the threshold value.

26. The method of claim 23, wherein the step of analysing the at least two speeds further comprises analysing the occurrence of abnormal speed fluctuations in two or more of the cylinders so as to determine if an injection parameter correction for fuel quality is required.

27. The method of claim 26, comprising determining that an injection parameter correction for fuel quality is required when abnormal speed fluctuations occur in two or more of the cylinders at substantially the same time.

28. A method of determining an injection parameter correction for fuel quality, comprising determining if an injection parameter correction is required in accordance with the method of claim 19 and, if so, adjusting an injection parameter to determine the injection parameter correction for fuel quality.

29. The method of claim 28, wherein the injection parameter comprises the quantity of fuel delivered with each injection, and the injection parameter correction comprises a modification of the quantity of fuel delivered with each injection.

30. The method of claim 28, wherein the injection parameter comprises the interval between consecutive injections of fuel and the injection parameter correction comprises a modification of the interval between consecutive injections of fuel.

31. The method of claim 28, wherein the injection parameter comprises an injection timing and the injection parameter correction is an injection timing correction.

32. The method of claim 31, wherein the injection timing correction comprises a modification of the timing at which fuel is injected relative to the combustion cycles of the cylinders.

33. The method of claim 28, wherein the injection parameter correction is determined by:

providing a calibration curve comprising a plurality of injection parameter correction values, each correction value being associated with a magnitude of a speed fluctuation;

addressing the calibration curve with the computed speed fluctuation of a cylinder; and reading the correction value associated with the computed speed fluctuation in the calibration curve so as to determine the injection parameter correction.

34. The method of claim 28, wherein the injection parameter correction is an incremental correction.

35. The method of claim 34, comprising reading a magnitude of the incremental correction from a memory.

36. The method of claim 28, wherein the injection parameter correction is an offset to be applied to the injection parameter.

37. The method of claim 28, further comprising repeating the steps of observing the speed of the combustion cycles of at least two of the cylinders, analysing the at least two speeds to determine if an injection parameter correction for fuel quality is required and, if so, adjusting the injection parameter so as to arrive at an optimised injection parameter correction for fuel quality.

38. The method of claim 28, further comprising:

determining a weighting function for engine load; and applying the weighting function to the injection parameter correction.

39. The method of claim 28, further comprising storing the injection parameter correction in a memory.

40. A method for determining an injection parameter corrected for fuel quality in an internal combustion engine, comprising:

determining an injection parameter correction in accordance with the method of claim 28; and adjusting the injection parameter in accordance with the injection parameter correction for a subsequent combustion event.

41. The method of claim 40, comprising:

determining a nominal injection parameter according to an engine load demand; and applying the injection parameter correction to the nominal injection timing so as to determine an injection parameter corrected for fuel quality.

42. The method of claim 40, comprising applying the injection parameter correction to pilot and/or post injections of the fuel injector.

* * * * *